T. ZIMMERMAN.
AXLE.
APPLICATION FILED SEPT. 14, 1918.
1,321,874.
Patented Nov. 18, 1919.
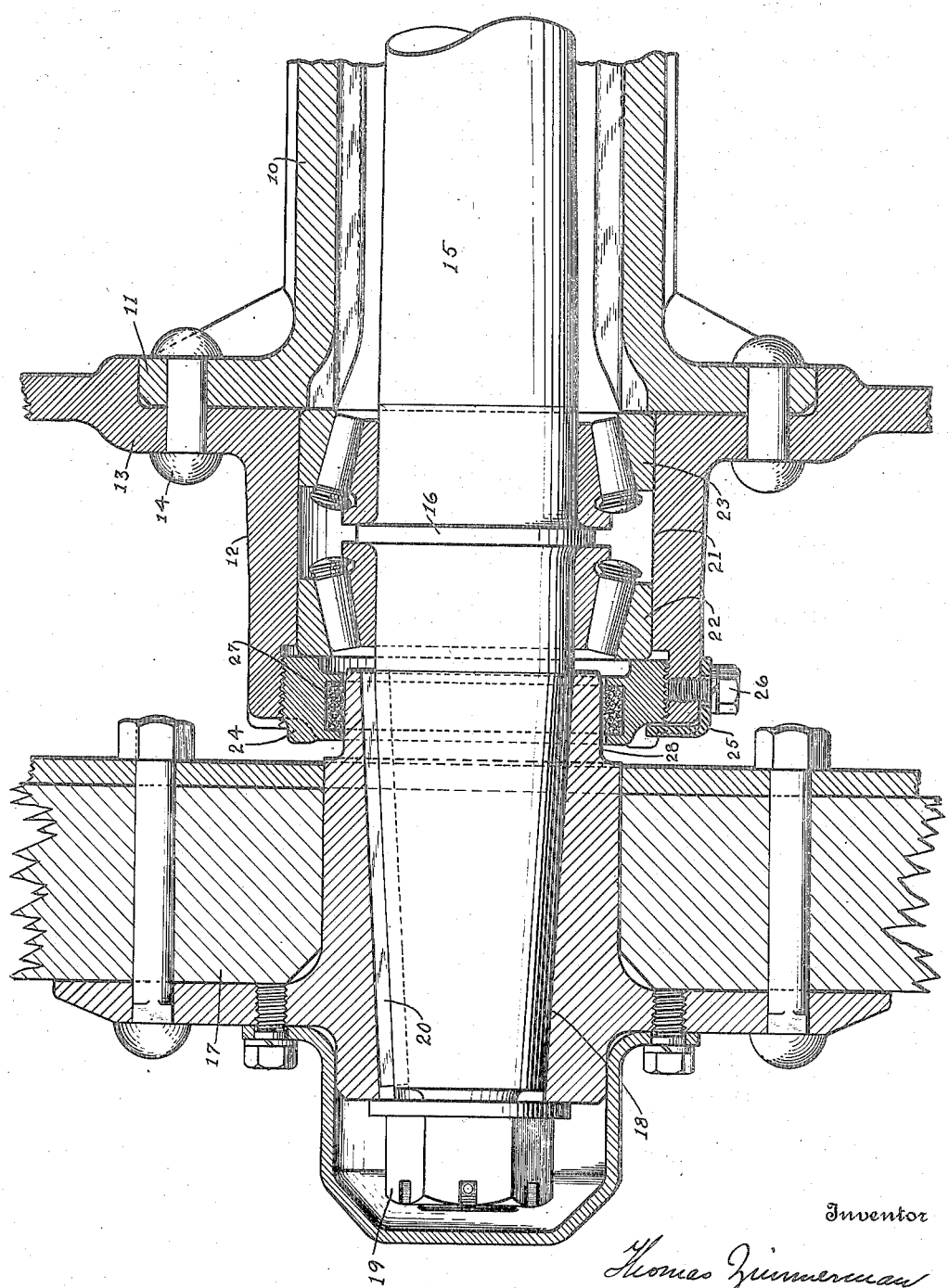
Inventor
Thomas Zimmerman
By B. M. Kent
Attorney

UNITED STATES PATENT OFFICE.

THOMAS ZIMMERMAN, OF CLEVELAND, OHIO, ASSIGNOR TO THE STANDARD PARTS COMPANY, OF CLEVELAND, OHIO, A CORPORATION OF OHIO.

AXLE.

1,321,874.      Specification of Letters Patent.      Patented Nov. 18, 1919.

Application filed September 14, 1918. Serial No. 254,121.

*To all whom it may concern:*

Be it known that I, THOMAS ZIMMERMAN, a citizen of the United States, and a resident of Cleveland, county of Cuyahoga, State of Ohio, have invented certain new and useful Improvements in Axles, of which the following is a specification.

This invention relates to motor vehicle axles and more particularly to driving axles.

One of the objects of the invention is to provide a semi-floating axle with thrust bearings at each end for taking the thrusts in the driving shafts in both directions. Other objects and the features of novelty will be apparent from the following description taken in connection with the accompanying drawing, which is a longitudinal section through one end of an axle embodying the invention.

Referring to the drawing, 10 indicates the axle housing which is provided with an end flange 11 to which the extension 12 is secured, this extension having the flange 13 which is secured to flange 11 by rivets 14, or in any other suitable manner. The driving shaft is indicated at 15 and has the integral collar 16 formed thereon, within the extension 12. The wheel 17 is secured to the outer end of the shaft 15 by means of the taper fit 18 and the nut 19, a key 20 being also provided. The particular method of securing the wheel to the shaft 15, however, forms no part of the present invention.

The extension 12 is provided with a bore 21 preferably slightly larger than the bore of the housing 10 and in this bore the roller bearings 22 and 23 are supported.

The end of the housing 10 constitutes an abutment for the bearing 23, and both bearings abutting the collar 16 and being oppositely arranged as shown so that, together, these will be capable of taking thrusts in both directions. The bearings 22 and 23 are of the conical roller type and in order to secure them and the shaft 15 against axial movements a ring nut 24 is threaded in the outer end of the extension 12 and engages the bearing 22 as shown. The ring 24 is adjustable, as will be readily noted, and is locked by means of the dog 25, the latter being held by the bolt 26. The ring 24 may have a soft packing 27 coöperating with a smooth outer surface 28 on the hub of the wheel 17, for the purpose of preventing the lubricant for the bearings 22 and 23 from escaping. The bearings 22 and 23, being held against axial movements relative to the housing 10 and a shaft 15 being held, by the collar 16, against axial movements relative to the bearings, it will be evident that the arrangement which I have provided constitutes a simple and efficient means for taking end thrusts in the shaft 15 and avoids difficulties which arise from the prior constructions wherein there is a single bearing in each end of the housing for taking thrusts in one direction and the two driving shafts are in abutting relation at the center of the housing.

Having thus described my invention what I claim is:

1. In an axle, the combination of a housing, a driving shaft therein, a collar on said shaft, a pair of oppositely arranged roller bearings engaging opposite sides of said collar, an abutment on the interior of said housing, engaged by the innermost of said bearings, and adjustable means at the end of said housing for securing said bearings and shaft.

2. In an axle, the combination of a housing, a driving shaft therein, a collar on said shaft, a wheel mounted on the outer end of said shaft, a pair of roller bearings on opposite sides of said collar supporting said shaft in said housing and adapted to take end thrust in either direction, an abutment on the interior of said housing engaged by the innermost of said bearings, and an adjustable ring at the outer end of said housing coöperating with said abutment to hold said bearing from movement in either direction in said housing.

3. In an axle, the combination of a housing having a flange at the end thereof, an extension for the housing secured to said flange and bored to receive bearings, a shaft in said housing having a collar within said extension, a pair of roller bearings engaging opposite sides of said collar the innermost of said bearings abutting the end of said housing, and a ring adjustably arranged in the outer end of said extension and engaging the outermost of said bearings to hold the same against axial movement.

In testimony whereof I affix my signature.

THOMAS ZIMMERMAN,